(No Model.) 2 Sheets—Sheet 1.

J. RAGOUCY.
HUB FOR VEHICLE WHEELS.

No. 510,519. Patented Dec. 12, 1893.

Witnesses:
E. B. Bolton
E. H. Sturtevant

Inventor:
Joachim Ragoucy
By Richards
his Attorneys

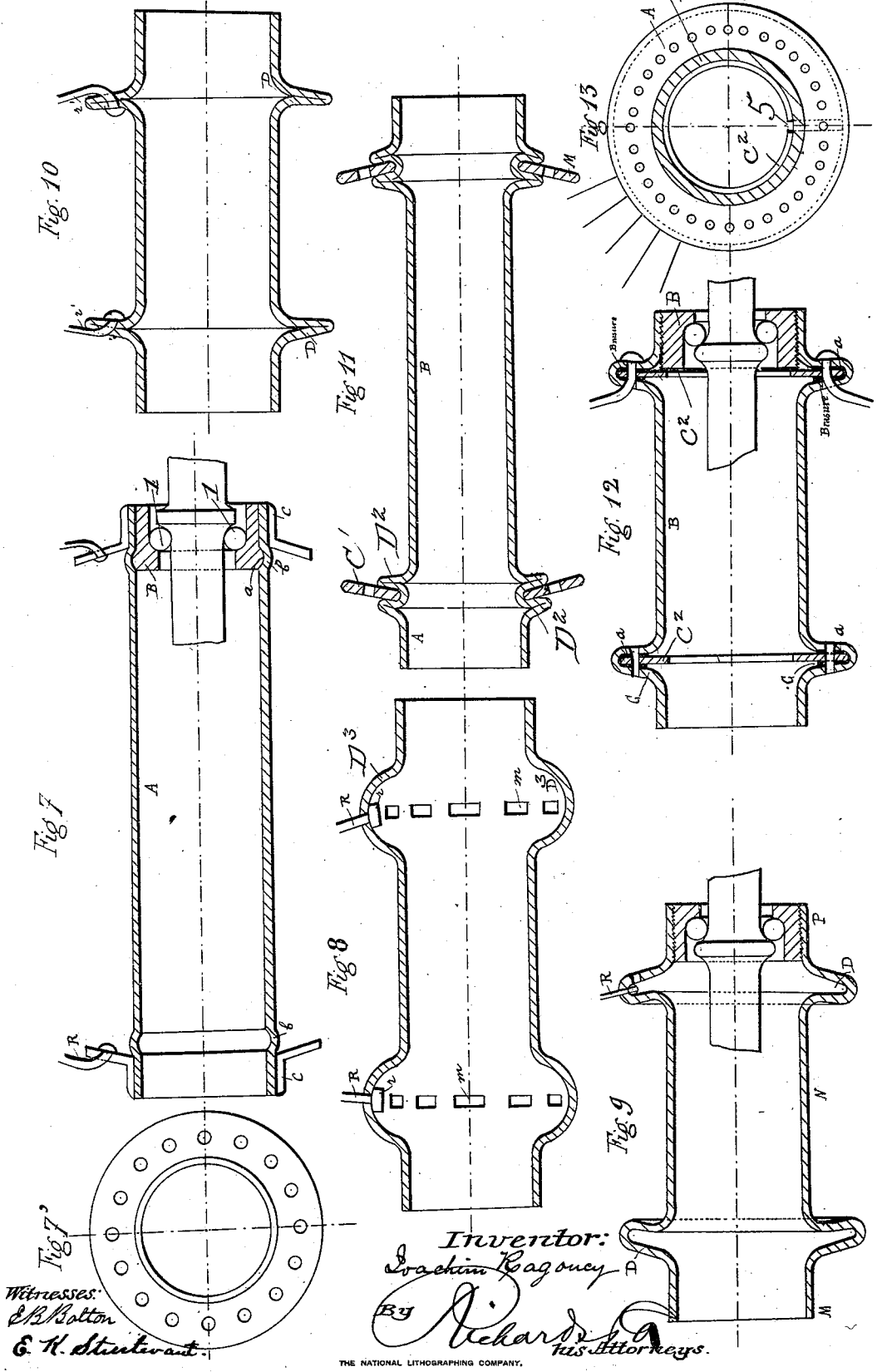

UNITED STATES PATENT OFFICE.

JOACHIM RAGOUCY, OF PARIS, FRANCE.

HUB FOR VEHICLE-WHEELS.

SPECIFICATION forming part of Letters Patent No. 510,519, dated December 12, 1893.

Application filed March 31, 1893. Serial No. 468,486. (No model.)

*To all whom it may concern:*

Be it known that I, JOACHIM RAGOUCY, a citizen of the French Republic, residing at Paris, France, have invented certain new and useful Improvements in Hubs for Vehicles, of which the following is a specification.

It is the object of my invention to provide a simple, strong and inexpensive form of hub for bicycles and like vehicles which may be readily and quickly manufactured at comparatively small cost.

The invention includes a hub made from a plain cylinder or tube having annular ribs or swells formed by swaging the metal of the tube or cylinder; said ribs are adapted to hold the spokes or other parts.

The invention includes other features hereinafter set forth.

In the drawings:—Figure 1, shows the blank from which the hub is formed, in section. Fig. 2, shows the hub after being swaged. Figs. 3 and 4, are similar views showing different degrees of swaging to which the blank may be subjected to provide different forms of annular ribs. Fig. 5, shows a form of hub in which the two opposing walls of the swaged portion are pressed together. Fig. 6, is a similar view showing a hub in which the central portion is of less diameter than the ends beyond the ribs. Fig. 7, is a sectional view of a hub with spokes attached and the bushing in place. Fig. 7' shows attaching ring. Figs. 8, 10 and 11, are modifications of the hub. Figs. 9 and 12, are further modifications showing different forms of end bushings from that shown in Fig. 7. Fig. 13, is an end view of Fig. 12, partly in section. Fig. 14 is a view of another modification.

In making the hub I take a plain tube or cylinder A, Fig. 1, and place it upon a suitable mandrel adapted to keep the interior of a uniform diameter and then by applying suitable swaging dies or chucks to the outside I upset or swage the tube into the form shown in Fig. 2, with the annular ribs or swells D, near the ends; the center N and the extremities M, P, remaining of the original diameter. By carrying the action to a greater extent the rib may be made more prominent as in Figs. 3 and 4 or by giving the chucks sufficient movement longitudinally of the blanks, the sides of the upset rib may be pressed into contact as in Figs. 5 and 6. Fig. 6, also shows a form of hub in which center N is of less diameter than the extremities M, P. This form may be obtained by any suitable means known to those skilled in the art.

In Fig. 7, the swaged rib D is utilized to afford a bearing for the ring $c$ to which the spokes R are attached and also to hold the bushing B, within the end of the tube, said bushing having an annular bead or rib $b$, fitting into the concavity of the swaged rib D. This bushing serves as a bearing for the shaft the antifriction balls $l$ being interposed between the shaft and bushing as usual. The ring $c$, may be fitted to the end of the hub in any suitable manner, by driving it thereon or by threading the ring and hub.

Figs. 9 and 12, show a bushing which is threaded into the ends of the hub and Fig. 11 illustrates another method of securing the ring C' to which the spokes are attached by the two swaged ribs $D^2$ having an annular seat between them for the ring.

In Fig. 8, the spokes are shown as having heads $r$, which retain them in connection with the perforated annular rib $D^3$, the spokes extending out through the perforations.

Fig. 9 illustrates a similar arrangement of the spokes in connection with a more prominent rib.

Fig. 10, shows the manner of arranging the spokes in connection with the form of hub illustrated in Fig. 5, in which the two sides of the rib are pressed together and the spokes pass through them and are headed on their ends.

Figure 4:
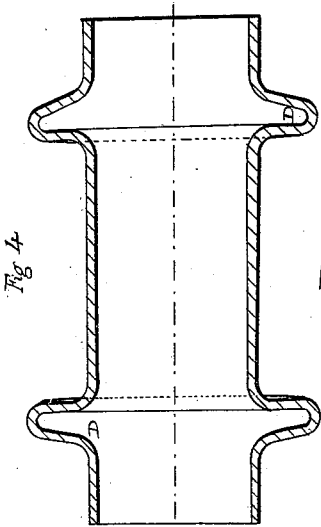
Figure 5:
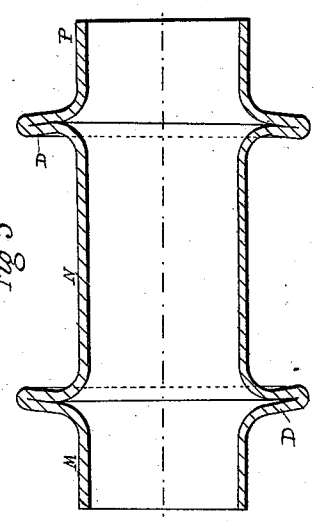
Figure 6:
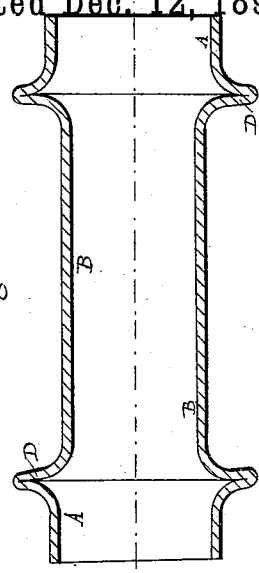
Figure 14:
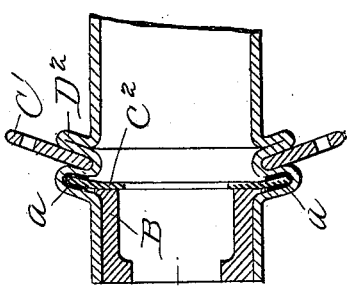
Figure 1:
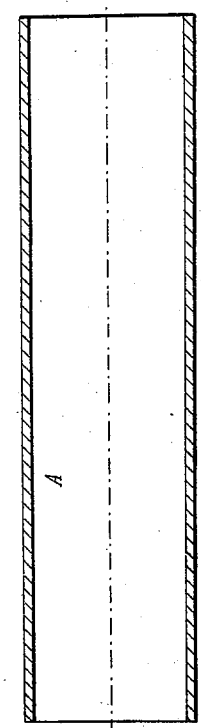
Figure 2:
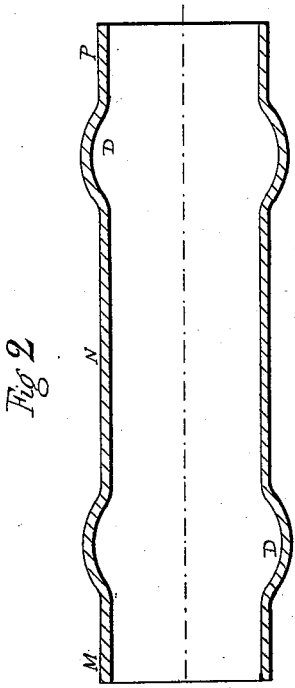
Figure 3:
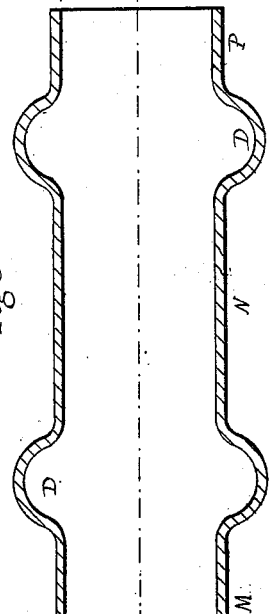

As shown in Figs. 12 and 13, a split ring $c^2$ is introduced into the hub, it being forced into proper position before the swaging takes place and then the metal of the hub is upset about it so as to inclose the ring in the swaged rib as shown in Fig. 12. The split formation of the ring shown at 5 Fig. 13, enables it to yield sufficiently to be introduced within the hub.

I prefer to inclose the edge of the ring in a brass washer $a$, which extends about the edge of the ring $c^2$ and partially across its sides. The brass washer fills the space between the ring $c^2$ and the inner side of the swaged rib and by applying heat the parts will be brazed together and the ring firmly held. The ring projects into the interior of the hub and acts as an interior bearing for the end of the bushing B.

I wish it understood that the ring and bushing may be applied to any of the forms of hubs above described to be held by the swaged portions thereof.

I claim—

1. A hub for a bicycle or the like consisting of a tube having annular ribs swaged thereon and the bushings in the ends of the hubs held by the said swaged portions, said bushings having a bead fitting said swaged portions, substantially as described.

2. A hub for a bicycle or the like consisting of a tube having annular ribs or swaged portions and the rings engaging the same to be held thereby, substantially as described.

3. A hub for a bicycle or the like consisting of a tube having annular ribs swaged thereon, the interior rings engaging said swaged portions to be held thereby and the bushings bearing against said rings.

4. In combination, the hub having the two annular ribs with a space between them and the ring C' fitting between said ribs and adapted to receive the spokes, substantially as described.

In witness whereof I have hereunto set my hand in presence of two witnesses.

JOACHIM RAGOUCY.

Witnesses:
A. CHAUFFOURIA,
F. HAUK.